United States Patent Office 2,771,465
Patented Nov. 20, 1956

2,771,465

ADSORPTION PROCESS FOR SEPARATING ELEMENTARY SULFUR FROM SULFURIZED DIARYL ALKANES

William B. Whitney, Bartlesville, Okla., assignor to Phillips Petroleum Company, a corporation of Delaware No Drawing. Application October 9, 1951,
Serial No. 250,565

10 Claims. (Cl. 260—139)

This invention relates to the removal of sulfur from organic compounds containing it in elementary form.

The removal of sulfur from organic compounds has been practiced in a variety of ways.

Of the various ways, both physical and chemical, which have been suggested for the removal of elementary or free sulfur from organic compounds, the use of silica gel to adsorb a portion of the material containing the sulfur has been set forth for the treatment of gasolines to remove sulfur therefrom. The adsorbed substances are removed by a water wash. Also, there has been set forth a similar method which removes gum-forming constituents by adsorbing sulfur and unsaturates together with aromatics from a stock containing them upon a silica gel. The adsorbed substances are then removed from the silica gel by distillation therefrom or by desorption with water followed by a reactivation by heating to drive off the water. It is now obvious to one skilled in the art that methods as described here by reference are not entirely satisfactory for a number of reasons among which is the difficulty encountered when attempting to properly heat a large mass of loose gel to distillation temperatures. This difficulty is substantially intensified when attempts are made to free the gel from water by means of heat and temperatures in the range of 400° to 600° C. are required to drive off water adsorbed on the gel.

A method for the removal of elementary or free sulfur from organic compounds, for example hydrocarbon fractions, which would not require heating of the gel, water washing thereof or any reactivation by distillation involving heat or other cumbersome difficulties is highly desirable. Also desirable is a process which would allow the sulfur to be removed without having to lose appreciable quantities of contaminated compound because the sulfur is removed by removing a portion of the compound from the total available stock to be treated.

I have discovered that elementary sulfur which often occurs naturally dissolved in organic compounds or is added as a reagent in a reaction or is formed from sulfur compounds during a reaction involving said organic compounds can be removed from such compounds by passing the compounds into contact with silica gel to cause the said compounds to be adsorbed thereon at ordinary temperatures, diluted if required or desired with a paraffinic hydrocarbon, preferably a light hydrocarbon such as pentane, and that when so doing the sulfur remains substantially unadsorbed so that by washing the silica gel with, for example, pentane, elementary sulfur will be found in the pentane wash while the adsorbed organic compounds remain in the silica gel.

Obviously, the organic compounds which are thus adsorbable on silica gel without sulfur being adsorbed, under the conditions of the invention, are various and can be olefinic hydrocarbons, aromatic hydrocarbons, phenolic compounds and even sulfurized aromatic or complex mixtures such as extracts from hydrocarbon lubricating oils.

Essentially the discovery which I have made appears to be based upon the fact that elementary sulfur contained as such in said organic compounds is not adsorbed to any appreciable extent by silica gel operating under ordinary temperatures. This discovery is most unexpected, particularly in view of the teachings of the art which show that contacting of silica gel with such compounds containing elementary or free sulfur results in the adsorption not only of the said compounds but of the sulfur.

Therefore, according to this invention there is provided a method which consists of passing compounds which are fairly strongly adsorbable on silica gel through a body or column of silica gel to adsorb the compound thus leaving the sulfur substantially unadsorbed and then washing the silica gel containing the adsorbed compound with a paraffinic hydrocarbon, preferably a light hydrocarbon such as pentane, to remove elementary sulfur from upon the body of silica gel and then employing a suitable desorbing agent, such as benzene or alcohol to recover the said organic compound free of elementary sulfur. The compound containing the free sulfur which is to be removed therefrom in some cases is desirably prediluted with a paraffinic hydrocarbon such as pentane prior to contacting it with the silica gel.

Example I

Diphenylbutane was treated with sulfur monochloride in the presence of anhydrous zinc chloride in order to sulfurize the diphenylbutane. The anhydrous zinc chloride was removed by filtration and the sulfur monochloride by distillation. The residue containing the sulfurized diphenylbutane product and some unreacted diphenylbutane and sulfur was diluted with pentane and passed through a 1½ inch column of a commercial fine (through 200 mesh) silica gel. The total depth of the silica gel in the column was approximately 3 feet. Washing with pentane gave elementary sulfur in the pentane fractions. The washings were continued until the pentane fraction was free of sulfur. The adsorbed material was eluted with benzene and recovered.

Example II

Diphenylbutane was treated with free sulfur at 290° C. The unreacted diphenylbutane was removed by distillation at reduced pressure. The residue was diluted with a mixture of pentane and benzene (the product was incompletely soluble in pentane alone) and charged to a silica gel column (see description of silica gel column in Example I). The pentane washed out appreciable quantities of free sulfur followed by sulfur free pentane. Washing with benzene removed the organic product.

Reasonable variation and modification are possible within the scope of this disclosure and the appended claims to the invention the essence of which is that it has been discovered that elementary or free sulfur contained in certain organic compounds will not be adsorbed by silica gel when the said compounds containing said sulfur are contacted therewith and that therefore by washing the said silica gel containing said compounds the sulfur can be removed following which the said compounds can be recovered from the said silica gel in substantially purified form and that a method for so recovering sulfur and purifying organic compounds has been set forth substantially as described.

I claim:

1. The removal of elementary sulfur from its admixture with a sulfurized diaryl alkane which has been prepared by sulfurizing a diaryl alkane under sulfurizing conditions which result in the presence of elementary sulfur in the sulfurized diaryl alkane which is produced, which comprises at ordinary temperatures, contacting said sulfurized diaryl alkane with silica gel thus causing the adsorption of said sulfurized diaryl alkane within the pores of said silica gel while at the same time elementary sulfur remains unadsorbed, washing said gel with a light paraffinic hydrocarbon thereby physically removing said elementary sulfur and any excess sulfurized diaryl alkane from the gel and then desorbing the sulfurized diaryl alkane from the gel by passing a desorbing agent into contact with said gel.

2. A method according to claim 1 wherein the sulfurized diaryl alkane is diluted in a paraffinic hydrocarbon prior to being contacted with said silica gel.

3. A method according to claim 1 wherein the sulfurized diaryl alkane is diluted with pentane before being contacted with said silica gel.

4. A method according to claim 1 wherein the desorbing agent is a liquid aromatic compound.

5. A method according to claim 1 wherein the desorbing agent is an alcohol.

6. A method according to claim 1 wherein the desorbing agent is benzene.

7. A method according to claim 1 wherein the washing agent is a light liquid paraffinic hydrocarbon.

8. A method according to claim 1 wherein the washing agent is pentane.

9. The removal of elementary sulfur from a sulfurized diaryl alkane containing chemically combined sulfur which has been sulfurized with a sulfurizing agent producing said sulfurized diaryl alkane and elementary sulfur which comprises, at ordinary temperatures, contacting said sulfurized diaryl alkane with silica gel thus causing the adsorption of said sulfurized diaryl alkane upon said silica gel while at the same time elementary sulfur remains unadsorbed, washing said gel with a light paraffinic hydrocarbon thereby physically removing said elementary sulfur and any excess sulfurized diaryl alkane from the gel and then desorbing the sulfurized diaryl alkane from the gel.

10. The removal of elementary sulfur from sulfurized diphenylbutane containing chemically combined sulfur which has been sulfurized with a sulfurizing agent selected from the group consisting of sulfur monochloride and elemental sulfur producing sulfurized diphenylbutane product containing chemically combined sulfur and elemental sulfur which comprises diluting said sulfurized product with a light paraffinic hydrocarbon, contacting the diluted product with silica gel thus causing the adsorption of said sulfurized diphenylbutane upon said silica gel while at the same time elementary sulfur remains unadsorbed, washing said silica gel with a light paraffinic hydrocarbon, thereby physically removing said elementary sulfur and any excess sulfurized diphenylbutane from the gel and then desorbing the adsorbed sulfurized diphenylbutane from the gel.

References Cited in the file of this patent

UNITED STATES PATENTS

| | | |
|---|---|---|
| 1,678,298 | Patrick et al. | July 24, 1928 |
| 1,886,261 | Miller et al. | Nov. 1, 1932 |
| 2,441,572 | Hirschler et al. | May 18, 1948 |
| 2,464,311 | Hiatt et al. | Mar. 15, 1949 |
| 2,470,339 | Claussen et al. | May 17, 1949 |
| 2,515,242 | Lukasiewicz | July 18, 1950 |
| 2,521,357 | Furnoy | Sept. 5, 1950 |

OTHER REFERENCES

Kalichevsky et al.: Chemical Refining of Petroleum (1942), revised edition, Reinhold Publishing Corp. 330 W. 42nd St., New York, N. Y., pages 32 and 20.

Australian Chemical Institute, Journal and Proceeding, vol. 14, pp. 61–7 (1946). Abstracted in Chem. Abs., vol. 41, column 4913$b$ (1947).